United States Patent [19]

Moriguchi et al.

[11] Patent Number: 4,913,812
[45] Date of Patent: Apr. 3, 1990

[54] ACTIVE SUPPORT SUBSTANCE AND ADSORBENT FOR CHROMATOGRAPHY

[75] Inventors: Soyao Moriguchi; Yoshito Nakayama; Hiroshi Suzuki; Tae Ishii; Seiji Shioda; Isao Kaiho, all of Tokyo, Japan

[73] Assignee: Showa Denko Kabushiki Kaisha, Tokyo, Japan

[21] Appl. No.: 290,861

[22] Filed: Dec. 29, 1988

Related U.S. Application Data

[63] Continuation of Ser. No. 946,302, Dec. 24, 1986, abandoned.

[30] Foreign Application Priority Data

| Dec. 26, 1985 | [JP] | Japan | 60-292300 |
| Dec. 26, 1985 | [JP] | Japan | 60-292301 |
| Dec. 27, 1985 | [JP] | Japan | 60-292551 |
| Dec. 27, 1985 | [JP] | Japan | 60-292552 |
| Dec. 27, 1985 | [JP] | Japan | 60-292553 |
| Dec. 27, 1985 | [JP] | Japan | 60-292554 |
| Dec. 27, 1985 | [JP] | Japan | 60-292555 |
| Dec. 27, 1985 | [JP] | Japan | 60-292556 |
| Jan. 9, 1986 | [JP] | Japan | 61-1243 |
| Jan. 9, 1986 | [JP] | Japan | 61-1244 |

[51] Int. Cl.$^4$ ............................................. B01D 15/08
[52] U.S. Cl. .................. 210/198.2; 210/502.1; 210/635; 210/656; 502/402; 502/403; 521/53; 521/149; 526/273
[58] Field of Search ............ 210/635, 656, 198.2, 210/502.1; 502/401, 402, 403; 521/53, 149; 526/273

[56] References Cited

U.S. PATENT DOCUMENTS

| 3,873,514 | 3/1975 | Chu | 210/635 |
| 3,917,527 | 11/1975 | Shaltiel | 210/635 |
| 3,960,720 | 6/1976 | Porath | 210/635 |
| 4,089,823 | 5/1978 | Kalal et al. | 521/53 |
| 4,118,347 | 10/1978 | Ishiguro et al. | 526/13 |
| 4,330,440 | 5/1982 | Ayers | 210/635 |
| 4,415,700 | 11/1983 | Batz et al. | 524/548 |
| 4,421,650 | 12/1983 | Nagasawa | 210/635 |
| 4,431,544 | 2/1984 | Atkinson | 210/635 |
| 4,431,546 | 2/1984 | Hughes | 210/656 |
| 4,468,330 | 8/1984 | Kamiyama | 210/656 |
| 4,512,898 | 4/1985 | Oi | 210/656 |
| 4,544,485 | 10/1985 | Pinkerton | 210/635 |
| 4,565,832 | 1/1986 | Kobashi | 210/635 |
| 4,577,013 | 5/1986 | Herz | 210/656 |
| 4,604,207 | 8/1986 | Oi | 210/635 |
| 4,693,985 | 9/1987 | Degen | 210/635 |

FOREIGN PATENT DOCUMENTS

| 0054249 | 6/1982 | European Pat. Off. | 210/635 |
| 0054685 | 6/1982 | European Pat. Off. | 210/635 |
| 0066209 | 12/1982 | European Pat. Off. | 210/635 |
| 6187652 | 5/1986 | Japan | 210/635 |
| 1431940 | 4/1976 | United Kingdom | 210/635 |
| 1566647 | 5/1980 | United Kingdom | 210/635 |
| 1577270 | 10/1980 | United Kingdom | 210/635 |
| 2048896 | 12/1980 | United Kingdom | 210/635 |
| 2168357 | 12/1984 | United Kingdom | 210/635 |

OTHER PUBLICATIONS

Journal of Chromatography, 244 (1982) 49–56, "High-Performance Liquid Affinity Chromatography on Silica-Bound Concanavalin A", Axel Borchert, Per-Olof Larsson and Klaus Mosbach.

*Primary Examiner*—Ernest G. Therkorn
*Attorney, Agent, or Firm*—Albert L. Jeffers; John F. Hoffman; Lawrence A. Steward

[57] ABSTRACT

The active support substance and the adsorbent for chromatography, which have got all of the properties desired for affinity chromatography, can be constituted by a porous copolymer comprising gel copolymer which is principally composed of (A) a glycidyl monovinylester or glycidyl monovinylether and (B) alkyleneglycol divinylester, and combination groups to be bound to ligands through a covalent bond, the (A) component being crosslinked by the (B) component, and the combination groups being bound to epoxy groups of the (A) component.

12 Claims, 8 Drawing Sheets

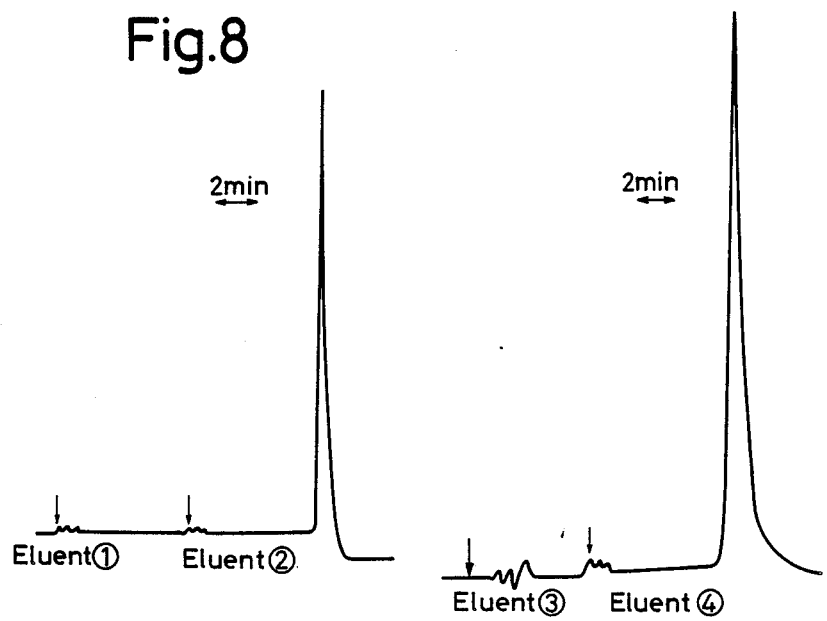
Fig.8
Fig.9
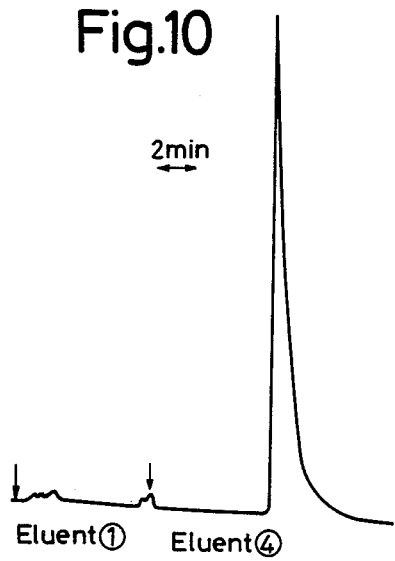
Fig.10
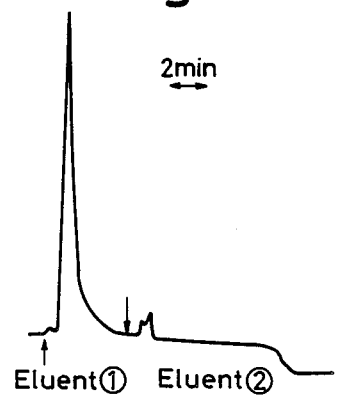
Fig.11

ACTIVE SUPPORT SUBSTANCE AND ADSORBENT FOR CHROMATOGRAPHY

This is a continuation of application Ser. No. 946,302, filed Dec. 24, 1986, now abandoned.

FIELD OF THE INVENTION

The present invention relates to an active support substance and an adsorbent for use in various types of chromatography such as affinity chromatography.

BACKGROUND OF THE INVENTION

Affinity chromatography is used to perform isolation and purification by utilizing the affinity between a pair of substances having a specific interaction. For example, affinity chromatography is useful for purifying organic substances by distinguishing their biological property, or a specific chemical structure in the molecule.

An adsorbent for affinity chromatography (affinity gel) can be produced by binding combination groups (spacers) to an insoluble matrix to prepare an active support substance and then binding a ligand to the above spacer. Adsorption of a substance which specifically interacts with the ligand is performed by using this adsorbent.

Illustrative examples of a combination of such substance and a ligand are as follows.

Enzyme—Substrate, Product, Inhibitor, Co-Enzyme, Effector,
Antigen—Antibody,
Receptor—Agonist,
Nucleic Acid—Base Pair,
Lectin—Saccharose (Protein),
Metal Chelate—Protein,
Hydrophobic Group—Protein,
Host—Guest.

In a separation or purification process or an analysis by the affinity chromatography, it is desired that the above active support substance which is the main component of the adsorbent have the following properties: (1) minimal nonspecific adsorption, (2) high porosity, (3) easily entering into combination with a great amount of the ligand, (4) adequate chemical stability under various conditions of pH, salt concentration and temperature, (5) no volume variation, (6) sufficient physical strength and stability, (7) high fluidity and (8) good resistance to biological contamination.

These desired properties are not always satisfied by conventional bases for affinity-chromatographic adsorbents such as cellulose, dextran, polyacrylamide and agarose. These typical materials are so-called soft gels having insufficient hardness and therefore have inferior fluidity and unfavorable separation characteristics which are vital disadvantages. They also have only a short life.

Silica beads which have been used recently have adequate hardness. However, since this material can not be used under alkaline conditions, use of this material greatly restricts the conditions for isolation, elution and washing.

SUMMARY OF THE INVENTION

It is an object of the present invention to provide an active support substance and an adsorbent for chromatography which are free from the above-mentioned disadvantages of the conventional adsorbents for chromatography and have all of the desired properties.

The above object of the present invention is accomplished by an active support substance for chromatography of the present invention which comprises a porous copolymer which is principally composed of (A) a glycidyl monovinylester or glycidyl monovinylether and (B) alkyleneglycol divinylester, and combination groups to be bound to ligands through a covalent bond, the (A) component being crosslinked by the (B) component, and the combination groups being bound to epoxy groups of the (A) component.

The above object of the present invention is also accomplished by an adsorbent for chromatography of the present invention which comprises a porous copolymer which is principally composed of (A) a glycidyl monovinylester or glycidyl monovinylether and (B) alkyleneglycol divinylester, combination groups bound to epoxy groups of the (A) component, and ligands bound through a covalent bond to the combination groups.

BRIEF EXPLANATION OF THE DRAWINGS

FIGS. 1A, 1B, 2A and 2B show chromatograms of globulin subjected to adsorption and elution by the adsorbents in accordance with the present invention.

FIGS. 8, 9, 10, and 11 show chromatograms of a protein or an enzyme subjected to adsorption and elution by the adsorbents in accordance with the present invention.

DETAILED DESCRIPTION OF THE INVENTION

Figure 1:
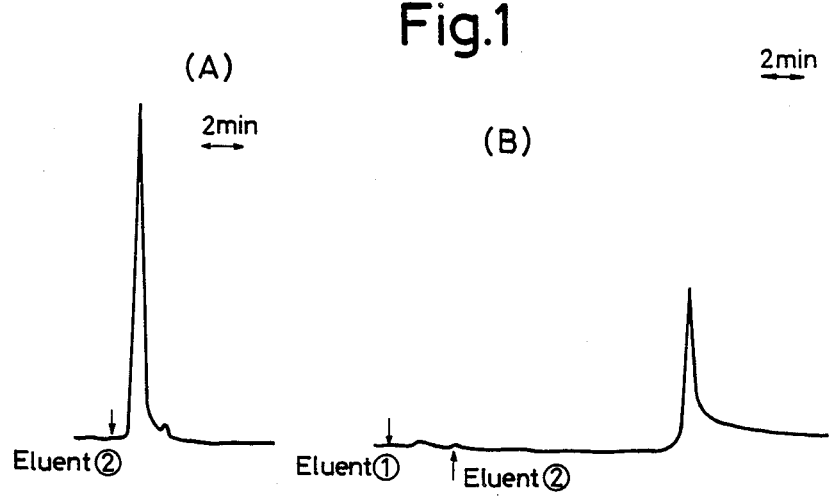
In FIGS. 1 and 2, (A) is the case where only the eluent ② is used, and (B) is the case where the eluent ① is used first and then substituted by the eluent ② from the time as indicated by the arrow.

As specified in the U.S. Pat. No. 4,118,347, the copolymer in accordance with the present invention can be prepared by producing a porous gel having particles sized and dimensioned to effect chromatographic separation by subjecting (A) glycidyl monovinylester or glycidyl monovinylether and (B) alkyleneglycol divinylester to aqueous suspension polymerization in the presence of a water-insoluble organic diluent.

Since the above components (A) and (B) are difficultly soluble in water, these compounds can be copolymerized by aqueous suspension polymerization which can be accomplished by an oil-in-water type suspension method. Due to the presence of an organic diluent in the copolymerization system, the component (A) is subjected to cross-linking by the component (B) which is the chief cross-linking component. Most of the epoxy groups of the component (A) which have not undergone any ring-opening reaction are left in the copolymerization product. The presence of the organic solvent also facilitates adjusting the hole diameter of the resulting porous gel.

Glycidyl esters of monovinylcarboxylic acids containing 3~12 carbon atoms and glycidyl ethers of monovinylalcohols containing 3~12 carbon atoms can be used as the above component (A). Of these compounds, those containing small numbers of carbon atoms are especially preferred which include glycidyl methacrylate, glycidyl acrylate and allylglycidyl ether.

It is preferable that an acrylic or methacrylic ester of an alkyleneglycol containing 2 or 3 carbon atoms or its polymer be used as the component (B) by which the component (A) is subjected to cross-linking. For example, alkyleneglycol divinylesters such as ethyleneglycol diacrylate, ethyleneglycol dimethacrylate, propyleneglycol diacrylate and propyleneglycol dimethacrylate as well as polyalkyleneglycol divinylesters such as polyethyleneglycol dimethacrylate and polypropyleneglycol dimethacrylate can be used as the component (B).

The molar ratio of the component (A) to the component (B) should be 10~90 to 90~10 preferably 40~80 to 60~20. It is possible to replace at most half the amount of the component (A) by a comonomer or a lower vinylester such as methyl methacrylate, methyl acrylate or vinyl acetate. It is a matter of course that the content of epoxy groups in the resulting copolymer increases as the proportion of the component (A) increases. A higher proportion of the component (B) results in a higher degree of cross-linking to produce a hard copolymer which has a dense network-like structure and a smaller degree of swelling. Copolymer gels having all the desired characteristics and properties can not be produced when the molar ratio between the two components is outside the above range.

The organic diluent used in this invention may be anything that is not activated during polymerization, is either insoluble or difficultly soluble in water and dissolves the organic monomers. The volume of the organic diluent should be at least 30% preferably 40~80% of the total volume of the diluent and the monomer components. Use of a greater amount of the organic diluent generally results in an inhibition of the ring-opening reaction of the epoxy group during polymerization. It is usually possible to make 60~90% of the epoxy group molecules contained in the original amount of the component (A) remain in the polymerization product. It seems that the remaining epoxy group molecules are either hydrolyzed during polymerization or spent for cross-linking.

As mentioned above, the content of epoxy groups in the resulting gel can be controlled by the ratio of the component (A) to the component (B) or partial substitution of a comonomer for the component (A) as well as by the amount of the organic diluent. The content of the epoxy oxygen in the polymer product is preferably at least 1 wt % and should be about 10 wt % at the maximum.

As mentioned above, the use of the organic diluent during aqueous suspension polymerization also facilitates controlling the hole diameter of the resulting porous gel. Use of an organic diluent having a low degree of swelling for the resulting gel causes phase separation in the suspended particles thereby producing a gel having giant holes. In contrast, use of a diluent having a high degree of swelling hardly causes phase separation since the resulting gel is in a swollen state during polymerization thereby producing a swollen polymer with relatively small hole diameter. The degree of swelling of the organic diluent can be known from its dissolution parameters. The organic diluents which can be advantageously used in this invention include cyclohexanone, chlorobenzene, benzene, toluene, n-propyl acetate, n-butyl acetate and n-octane which are described according to the order of higher swelling property for the resulting gel.

The original monomers can be subjected to aqueous suspension polymerization by a well-known usual method in the presence of a catalyst which produces free radicals. The volume of the aqueous phase should be at least equal to and up to about 10 times the volume of the organic phase although there is no special restriction on these volumes.

The aforementioned spacer can be introduced into the copolymer gel according to this invention by utilizing the reactivity of the epoxy group of the above component (A) in the copolymer gel. Although it is necessary for the combination groups to have a functional group which can enter into combination with a ligand through covalent bond, the structure of the combination group is not specially restricted except that it should have the above functional group. The above functional group which can enter into combination with a ligand can be, for example, an epoxy group, an amino group, a hydrazino group, a carboxyl group, a formyl group or a thiol group. It is possible to easily introduce the combination group into the polymer gel by a well-known method either through one reaction step or through at least two reaction steps. The introduction of the combination groups will be described according to examples in the following.

(i) Introducing combination groups which have an epoxy group as the functional group For example, after the epoxy group of the component (A) in the copolymer gel according to this invention is subjected to ring-opening modification by using a hydroxyl-group-containing compound such as water to produce a hydroxyl group, a compound having a glycidyl group is bound to the hydroxyl group thereby introducing a combination group which contains the epoxy group of the above glycidyl group. The resulting polymer where a glycidyl group has been introduced will be hereafter referred to as the modified copolymer gel according to the present invention. The above ring-opening modification is performed in the presence of acid or alkali, for example, by heating the copolymer in an aqueous solution containing sulfuric acid or hydrochloric acid as the catalyst at 70~100° C. for about two hours. It is preferable that the concentration of acid be 0.1~0.5N. Ring-opening modification of the copolymer proceeds almost quantitatively. For the compound having a glycidyl group which is bound to the hydroxyl group produced by ring-opening modification, epihalohydrins such as epichlorohydrin and epibromohydrin, diglycidyl ethers such as ethyleneglycol diglycidylether, 1,4-butanediol diglycidylether, polyethyleneglycol diglycidylether and alkyldiene diepoxides such as 1,3-butadiene epoxide and 1,7-octadiene epoxide can be used. The compound having a glycidyl group can be bound to the hydroxyl group either by making the copolymer gel having undergone ring-opening modification react with epichlorohydrin in an aqueous solution of an inorganic salt such as sodium hydroxide or potassium carbonate or by making the hydrophilic copolymer react with ethyleneglycol diglycidylether, 1,4-butanediol diglycidylether or polyethylenglycol diglycidylether in an aqueous solution of an inorganic base such as sodium hydroxide or potassium carbonate containing sodium boron hydride. It is preferable that the number of the —$C_2H_4O$— unit in the polyethyleneglycol diglycidylether used in this invention be 1~10.

(ii) Introducing combination groups having an amino group, a hydrazino group or a carboxyl group as the functional group A combination group containing an amino group, a hydrazino group or a carboxyl group which is represented by the general formula (II)

—NHR    (II)

with the reaction product. These reactions proceed according to the following formulae. In the formulae, (polymer base)

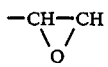

represents the copolymer gel or the modified copolymer gel according to the present invention and

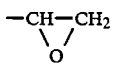

represents one epoxy or glycidyl group in these copolymers. Additionally, m is 1 or 2 and each of n, p, q and r is an integer of at least 1 (preferably 1~12).

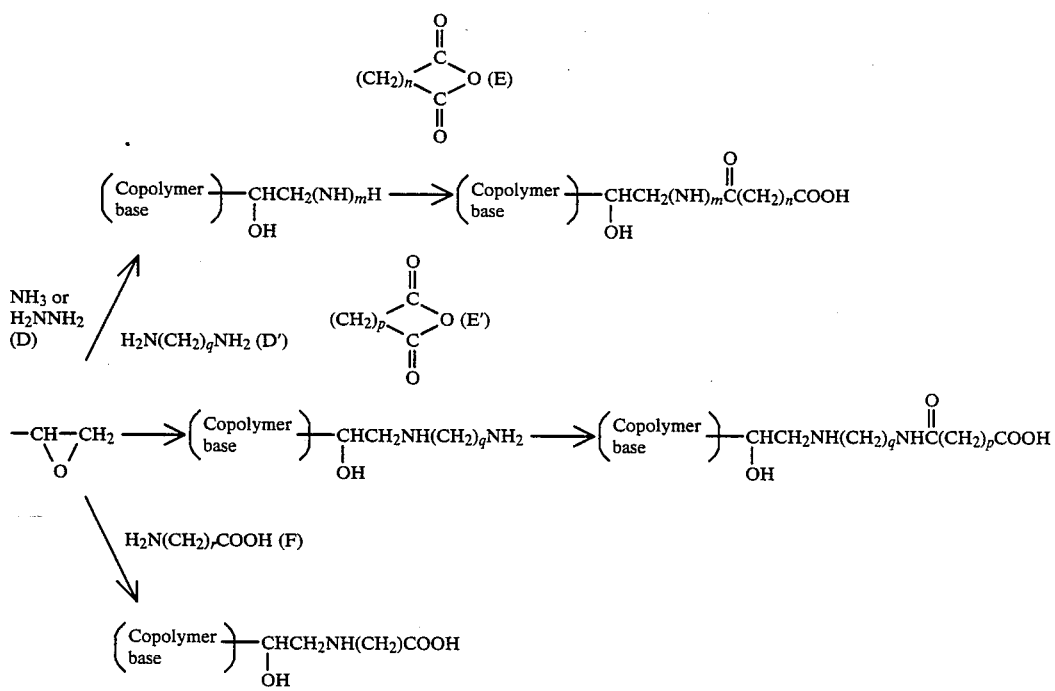

(wherein R is a hydrogen atom, an amino group, an ω-aminoalkyl group, ω-carboxyalkyl group, an ω-carboxyalkanoyl group, an ω-carboxyalkanoyl amino group or an ω-carboxyalkanoyl aminoalkyl group) is introduced into either the epoxy group of the component (A) in the copolymer gel according to the present invention or the glycidyl group in the modified copolymer gel according to the present invention by making an amino compound represented by the general formula (I).

H$_2$NR'    (I)

(wherein R' is a hydrogen atom, an amino group, an ω-aminoalkyl group or an ω-carboxyalkyl group) react with either the epoxy group of the component (A) or that of the glycidyl group in the modified copolymer. When an amino compound containing R' other than an ω-carboxyalkyl group is used, alternatively, the amino compound is made to react with the epoxy group and then alkylene carboxylic anhydride is made to react Although it is possible to make the compound represented by either the formula (D) or the general formula (D') or (F) in the above reaction formulae react with the epoxy group of the copolymer gel or the glycidyl group of the modified copolymer gel in the presence of a solvent, it is needless to use a solvent when these compounds are liquids under the reaction condition. Water is usually used as the solvent. The other compounds which can be used as the solvent include hydrocarbons such as n-hexane, benzene and xylene, ethers such as tetrahydrofuran and dioxane, chlorinated hydrocarbons such as chloroform and chlorobenzene, alcohols such as ethanol and methylcellosolve and ketones such as acetone and methylisobutyl ketone as well as dimethylformamide and dimethylsulfoxide. These compounds may be used singly or in combination. Although there is no special necessity for using a catalyst, it is possible to use the hydroxide or carbonate of an alkali metal or an alkaline earth metal such as sodium hydroxide or potassium carbonate.

Diaminoalkanes such as ethylenediamine, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane and 1,12-diaminododecane can be used as compounds represented by the general formula (D').

Aminocarboxylic acids such as glycine, β-alanine, 4-aminobutyric acid, 6-aminocaproic acid and 8-aminocaprylic acid can be used as compounds represented by the general formula (F).

Although there is no strict restriction on the reaction condition, it is preferable that the reaction be performed under the following condition.

(1) It is preferable that the ratio (a/b) of the weight (a) of the copolymer gel or the modified copolymer gel according to the present invention to the weight (b) of the compound represented by either the formula (D) or the general formula (D') or (F) be 1:0.3~10 preferably 1:0.3~3.

(2) It is preferably that the reaction temperature be 0~150° C. preferably room temperature ~100° C.

(3) It is preferable that the reaction time be 1~60 hours preferably 1~30 hours.

(4) It is preferable that the reaction pressure be normal pressure ~10 atm. preferably normal pressure.

There is no special requirement for treatment after the reaction and the reaction product may be properly treated by a usual method such as filtration or washing.

The chromatographic adsorbent which is produced by using a compound represented by the formula (D) or the general formula (D'), as necessary, is further treated to make an acid anhydride represented by the general formula (E) or (E') act upon the terminal amino group of the active carrier thereby converting it into an active carrier having a carboxyl group. Water is usually used as the solvent for this reaction and ethers such as tetrahydrofurane and dioxane, carboxylic acids such as acetic acid, and pyridine can also be used as the solvent. Although there is no special necessity for using a catalyst, it is possible to control the pH of the liquid reaction system by adding an acid such as hydrochloric acid or sulfuric acid or an alkali such as sodium hydroxide or potassium carbonate.

Succinic anhydrides, glutaric anhydrides, adipic anhydrides, pimelinic anhydrides, suberic anhydrides, azelaic anhydrides and sebacic anhydrides can be used as the alkylenecarboxylic anhydride represented by the general formula (E) or (E').

Although there is no strict restriction on the reaction condition, it is generally preferable that the reaction be performed under the following condition.

(1) It is preferable that the ratio (a'/b') of the weight (a') of the amination product of the copolymer gel or the modified copolymer gel according to the present invention to the weight (b') of the compound represented by the general formula (E) or (E') be 1:0.3~10 preferably 1:0.3~3.

(2) It is preferable that the reaction temperature be 0~150° C. preferably room temperature ~100° C.

(3) It is preferable that the reaction time be 1~60 hours preferably 1~30 hours.

(4) It is preferable that the reaction pressure be normal pressure ~10 atm. preferably normal pressure.

There is no special requirement for treatment after this reaction and the reaction product may be properly treated by a usual method such as filtration or washing.

There is another method for introducing combination groups having a carboxyl group as the functional group which consists of making an aminocarboxylic acid having hydroxyl groups act upon either the epoxy group of the copolymer gel (A) according to the present invention or the glycidyl group of the modified copolymer gel according to the present invention to bind the carboxyl group to the epoxy group or the glycidyl group. The hydroxyl groups referred to herein are separate and in addition to the carboxyl group.

Amino acid derivatives such as serine, homoserine, threonine, 4-hydroxyproline, 4-amino-3-hydroxybutyric acid and N-tris(hydroxymethyl)methylglycine and amino sugar derivatives such as glucosaminic acid can be used as aminocarboxylic acids having hydroxyl groups.

During this reaction, the epoxy group of the copolymer gel according to the present invention or the glycidyl group of the modified copolymer gel according to the present invention enters into combination with the amino group of the aminocarboxylic acid having a hydroxyl group to make the above epoxy group or glycidyl group undergo ring-opening reaction thereby producing a hydroxyl group and a carboxyl residue having a hydroxyl group.

The aminocarboxylic acid having a hydroxyl group can be made to act upon the epoxy group or the glycidyl group in the presence of a solvent. Water is usually used as the solvent for this reaction. And, hydrocarbons such as n-hexane, benzene and xylene, ethers such as tetrahydrofuran and dioxane, chlorinated hydrocarbons such as chloroform and chlorobenzene, alcohols such as ethanol and methylcellosolve and ketones such as acetone and methylisobutylketone as well as dimethylformamide and dimethylsulfoxide can also be used as the solvent. These compounds can be used either singly or in combination. Although there is no special necessity for using a catalyst, it is possible to use a hydroxide or a carbonate of an alkali metal or an alkaline earth metal such as sodium hydroxide or potassium carbonate as the catalyst.

There is no special restriction on the condition for this reaction and it is possible to perform this reaction under a condition similar to that used for making the compound represented by the above general formula (I) act upon the epoxy group or the glycidyl group.

Introducing combination groups by using the above aminocarboxylic acid having a hydroxyl group prevents even nonspecific adsorption ascribable to the hydrophobic property of the part of the copolymer gel or the modified copolymer gel other than the above copolymer base, or to the hydrophobic property of the spacer.

(iii) Introducing combination groups having a formyl group as the functional group It is possible to easily hydrolyze the functional group of the combination group having an epoxy group as the functional group which has been produced by the above introduction reaction (i) thereby converting the spacer into 1,2-glycol and then to convert the 1,2-glycol into a formyl group by making periodic acid act upon the 1,2-glycol. There is no special restriction on the condition for this reaction. This reaction can be performed by making periodic acid or its inorganic salt act upon the 1,2-glycol according to a usual method, for example, using water, ethanol, acetic acid or one of the mixtures of these liquids as the solvent at a temperature between room temperature and 50° C.

(iv) Introducing combination groups having a thiol group as the functional group It is possible to introduce a thiol group by making sodium thiosulfate act upon the functional group of the spacer having an epoxy group as the functional group which has been produced by the above introduction reaction (i) and then making hydrochloric acid act upon the modified combination group. There is no special restriction on the condition for this reaction. This reaction can be easily performed according to a usual method, for example, using water as the solvent at room temperature.

There is no special restriction on the type of a ligand to be used. The ligand may be chosen in consideration of an object to be adsorbed.

Preferable examples of the ligand to be used in accordance with the present invention include lectin, heparin, protein A, serum albumin, triazine dyestuff, acriflavine, phenylboric acid, iminodiacetic acid, ethylenediamine diacetic acid, biotin and N-acetyl glucosamine.

Lectin is a protein which enters into specific combination with sugar of a given structure. It has recently been determined that sugar protein or sugar lipid on cellular surface performs the key role in the self recognition of cells and in the intercellular transmission of information. Adsorbents containing lectin as the ligand are now being actively used for studies in this field.

There is no special restriction on the type of lectin which is bound to the above spacer. For example, plant lectins such as concanavalin A, and those derived from Abrus precatorius, Triticum vulgaris, Ricinus communis, Glycine max, Ulex europaeus, Phaselous vulgaris, Lotus tetragonolobus, Lens culinaris, Pisum sativum and Arachis hypogaea as well as animal lectins such as those derived from Limulus polyphemus, eels and snails can be used.

Heparin is a mucopolysaccharide having anticoagulant activity. It is capable of adsorbing various blood coagulation factors, lipoprotein lipase, DNA polymerase and many other proteins, so that it has been widely used as a ligand of the adsorbent for affinity chromatography.

Protein A is a protein obtained from a cell membrane of *Staphylococcus aureus.* Since it has a tendency to strongly adsorb immunoglobulin, it is useful as a ligand for affinity chromatography to study mechanisms of immunity.

Serum albumin is the major protein contained in a blood plasma and has a role to carry fatty acids, drugs and the like by combining thereto. Since it has a polypeptide structure including many optically active points, it is useful as a ligand of the affinity gel having an interaction with an optically active, physiologically active substance and thus useful in separation and analysis of such substance.

Triazine dyestuffs have found originally as the reactive dyestuffs for coloring fabrics. When the conjugate substance of dextrane of Cibaclon Blue F3GA which is one of triazine dyestuffs was used as a labelled reagent for gel filtration, the triazine dyestuffs was found to have an ability to adsorb enzymes such as dehydrogenase and kinase. Thereafter the triazine dyestuffs were found to have an ability to specifically combine with most enzymes that requires NAD+ and NADP+. As a result, the triazine dyestuffs have been widely used as a mean for many analyses and purifications in the field of biochemistry.

There is no special restriction on the type of a triazine dyestuff to be used. Illustrative examples are Cibaclon Blue 3G-A (Procion Blue H-B), Procion Red HE-3B, Procion Yellow H-A, and Procion Blue MX-3G.

Acriflavine is a cationic, tricyclic aromatic compound and have bactericidal activity. It is useful as a ligand for affinity chromatography in which many compounds having an aromatic ring can be adsorbed and isolated due to ionic interaction or charge transfer action.

Phenylboric acid may produce cyclic esters by its reversible reaction with the compound having hydroxyl groups combined respectively to the adjacent carbon atoms. It is useful as a ligand for affinity chromatography in which nucleosides, nucleotides, catechol amines, carbohydrates and t-RNAs can be adsorbed and isolated.

Iminodiacetic acid may produce many metal chelates of cobalt, nickel, copper, zinc, cadmium by taking a role of tridentate ligand with use of its two oxygen atoms and one nitrogen atom. On the other hand, proteins having specific amino acid may be ligands for metal atoms. Accordingly, iminodiacetic acid may be used as a ligand for chromatography in which proteins can be isolated and purified by iminodiacetic acid having metal atom combined thereto.

Ethylenediaminediacetic acid may produce many metal chelates as well as iminodiacetic acid. Accordingly, it is useful for isolation and purification of proteins.

Biotin is a vitamine which is widely distributed in livers and yeasts and takes a role of a co-enzyme of the enzymes which take place the reaction of fixing carbonic acid. It may specifically combine to avidin in an egg white and therefore it may be applied to an adsorbent for high-speed isolation or purification of unstable physiologically active substances which have conventionally isolated or purified by a soft gel.

N-Acetyl glucosamine has an affinity for an enzyme lysozyme existing in an egg white and a secretion of animals. In addition, it has an affinity for lectins such as derived from Triticum vulgaris. Therefore, N-acetyl glucosamine is useful as a ligand for affinity chromatography in which these enzymes and proteins are isolated or purified. A ligand may be bound to the combination group through covalent bond in a proper solvent, as necessary, by properly using a catalyst, a reagent or a similar agent according to the functional group of the spacer. For example, hydrochloric acid or an alkali such as sodium carbonate or sodium hydrocarbonate is typically used as the catalyst when the functional group is an epoxy group. N-hydrosuccinic imide or dicyclohexyl carbodiimide is typically used as the reagent when the functional group is a carboxyl group. A condensing agent such as 1-ethyl-3-(3-dimethylaminopropyl)carbodiimide is used when the functional group is a carboxyl group, an amino group or a hydrazino group. Besides, a reducing agent such as sodium cyanoboron hydride is used when the functional group is a formyl group. Water is usually used as the solvent and as the occasion demands a phosphate or acetate buffer solution can also be used as the solvent. It is possible to add an inorganic salt such as sodium chloride.

Although there is no strict restriction on the condition for the reaction between a ligand and the copolymer gel or the modified copolymer gel according to this invention, it is generally desirable that the reaction be performed under the following condition.

(1) It is preferable that the ratio by weight of the copolymer gel or the modified copolymer gel according to this invention to which the spacer has been bound to a ligand be 1:0.003~0.3 preferably 1:0.05~0.2.

(2) It is preferable that the reaction temperature be 0° C. ~ room temperature preferably 4° C. ~ room temperature.

(3) It is preferable that the reaction time be 1~72 hours preferably 2~12 hours.

There is no special requirement for treatment after this reaction and the reaction product may be properly treated by a usual method such as filtration or washing.

The present invention provides the active support substance as described above, which has active support groups and is able to be bound through a covalent bond to a ligand for affinity chromatography. The active support substance is, therefore, useful as a water-insoluble active support substance for affinity chromatography.

In addition, the active support substance, which has hydrophilic property derived from gelled copolymer or modified gelled copolymer in accordance with the present invention, is free from non-specific adsorption and may advantageously utilize its porous structure to the interaction between ligands and objects to be adsorbed.

Moreover, the active support substance of the present invention is a synthesized polymer produced through chemical covalent bonding. Therefore it is physically, chemically as well as physiologically stable and gets no influence under any conditions in the bonding of ligands, isolation and elution of the objects to be adsorbed as well as in the washing thereof. These good properties are necessitated for high performance liquid chromatography and industrial processes for isolation and purification.

This invention provides a chromatographic adsorbent which is produced by binding ligands through a covalent bond to proper combination groups which have been bound to a copolymer base having all the above properties desired for an adsorbent for affinity chromatography. Like the conventional soft gel adsorbent, the adsorbent of this invention can be used as a filler for affinity chromatography. Furthermore, since the adsorbent of this invention can be adequately used under pressure after being packed in a pressure-resistant column, the time required for chromatography is greatly reduced thereby increasing the efficiency of isolation and purification. Needless to say, this greatest advantage is essential for applying the adsorbent to high performance liquid chromatography or an industrial system for isolation and separation. As compared to a generally-used adsorbent for affinity chromatrography containing cyanogen bromide as the spacer, the adsorbent produced by binding ligands through covalent bond to the above spacer having been bound to the copolymer gel, having the aforementioned many advantages, is free from separation of the ligand during use and also the length of the spacer of this adsorbent can be arbitrarily controlled. Therefore, the ligand has an excellent ability to adsorb the intended substance and exhibits little nonspecific adsorption. Thus, the chromatographic adsorbent of this invention produces a great effect.

In the following, the method for producing the chromatographic adsorbent of this invention from well-known substances will be more tangibly described according to representative examples. It goes without saying that this invention is not restricted by these examples which are merely used for description.

EXAMPLE 1

After 6 ml of 25% aqueous ammonia was added to 2.0 g of copolymer gel containing epoxy groups and produced from glycidyl methacrylate and ethyleneglycol dimethacrylate, the mixture was heated to around 45° C. and made to undergo reaction for five hours while being agitated. Next, after the resulting gel was collected by filtration, the collected gel was washed by a great amount of water and dried. The amount of amine determined by neutralization titration was 1.3 mM per 1 g of the dry gel.

EXAMPLE 2

After the copolymer produced from glycidyl methacrylate and ethyleneglycol dimethacrylate was made to undergo ring-opening reaction by using water, glycidyl groups were introduced into the reaction product by using epichlorohydrin to prepare a gel (epoxy group: 0.3 mM per 1 g of the dry gel). Then, 1.0 g of the above gel was combined with 2.0 ml of water and 0.42 g of 1,3-diaminopropane and then the mixture was heated to 60° C. and made to undergo reaction while being agitated for 10 hours. Next, after the gel was collected by filtration and washed by water, 0.01N aqueous hydrochloric-acid solution and 0.1N aqueous sodium-hydrogencarbonate solution, the washed gel was again washed by a large amount of water and dried. The amount of amine determined by colorimetry using sodium trinitrobenzenesulfonate was 0.29 mM per 1 g of the dry gel.

EXAMPLE 3

After the copolymer produced from glycidylmethacrylate and ethyleneglycol dimethacrylate was made to undergo ring-opening reaction by using water, glycidyl groups were introduced into the reaction product by using 1,4-butanediol diglycidylether to prepare a gel (epoxy group: 0.25 mM per 1 g of the dry gel). Then, 1.0 g of the above gel was combined with a solution prepared by dissolving 0.5 g of sodium carbonate in 2 ml of water and 1.0 g of 4-aminobutyric acid and then the mixture was heated to 60° C. and made to undergo reaction while being agitated for 10 hours. Next, after the gel was collected by filtration and washed by water and 0.01N aqueous hydrochloric-acid solution, the washed gel was again washed by a large amount of water and dried. The amount of the amino group determined by nonaqueous titration using perchloric acid was 0.15 ml per 1 g of the dry gel.

EXAMPLE 4

After 5 ml of 0.1M aqueous sodium-chloride solution was added to 1.0 g of the gel produced in Example 1, 1.0 g of succinic anhydride was gradually added while adjusting the pH of the reaction solution to about 5 by using an aqueous sodium-hydroxide solution. Then, the mixture was agitated at room temperature for one day and the resulting gel was collected by filtration. Next, after the collected gel was washed by water, 0.1N aqueous sodium-hydrogencarbonate solution and 0.01N aqueous hydrochloric-acid solution, the washed gel was again washed by a large amount of water and dried. The amount of carboxylic acid determined by titration was 0.37 mM per 1 g of the dry gel.

EXAMPLE 5

After 0.6 g of the gel produced in Example 2 was added to 1.3 ml of a 0.2M aqueous dipotassium-hydrogenphosphate solution which contained 30 mg of heparin sodium, about 10 mg of sodium cyanoboron hydride was added and the thus prepared mixture was then heated to 60° C. and made to undergo reaction while being agitated for 15 hours. The resulting gel was then collected by filtration and washed by 1M aqueous sodium-chloride solution and water. Next, after the washed gel was added to 1 ml of 0.2M aqueous sodium-acetate solution, 0.5 ml of acetic anhydride was added and the mixture was agitated at room temperature for 30 minutes. Following that, the resulting gel was collected by filtration and then washed by water and 0.1N aqueous sodium hydroxide solution before being again washed by water. It was verified that the thus produced heparin-carrying gel adsorbs thrombin (about 10 mg per 1 g of the dry gel) contained in a 0.15M aqueous sodium-chloride solution and that the adsorbed thrombin can be eluted by feeding 0.125M aqueous sodium-chloride solution through the column.

EXAMPLE 6

After 1.0 g of the gel produced in Example 3 was sufficiently washed by absolute dioxane and the washed gel was added to 4 ml of absolute dioxane, 80 mg of N-hydroxysuccinic imide and 144 mg of dicyclohexyl carbodiimide were added and the mixture was agitated at room temperature for two hours. The resulting gel was then collected by filtration prior to being quickly washed by 20 ml of absolute dioxane, 6 ml of methanol and 3 ml of cool water in that order. Then, the washed gel was added to a solution prepared by dissolving 20 mg of concanavalin A and 25 mg of $\alpha$-methyl-D-mannopyranoside in 2 ml of an aqueous solution of 0.1 mM calcium chloride, 0.1 mM manganese chloride and 0.01M sodium hydrogencarbonate. Next, after the mixture was agitated at room temperature for two hours and left at 4° C. overnight, the resulting gel was collected by filtration and washed by 1M sodium-chloride solution and water. Following that, the washed gel was added to 2 ml of 1M Tris-hydrochloric acid buffer solution (pH 8.0) and the mixture was agitated at room temperature for one hour and then the gel was again collected by filtration and washed by water. It was determined from the amount of concanavalin A which had been recovered without undergoing any reaction that 12 mg of concanavalin A was carried by each 1 g of the thus produced dry gel.

EXAMPLE 7

After 1.0 g of the copolymer gel containing epoxy groups and produced in Example 1 was combined with 2.0 g of 1M aqueous sodium-hydroxide solution and 1.0 g of 4-amino-3-hydroxybutyric acid, the mixture was heated to 50° C. and made to undergo reaction while being agitated for six hours. Next, after the resulting gel was collected by filtration and washed by water and 0.01N aqueous hydrochloric-acid solution, the washed gel was again washed by a large amount of water and dried. The amount of the amino group determined by nonaqueous titration using perhydrochloric acid was 0.45 mM per 1 g of the dry gel.

EXAMPLE 8

After 1.0 g of the gel produced by introducing glycidyl groups in Example 2 (epoxy group: 0.5 mM per 1 g of the dry gel) was combined with a solution prepared by dissolving 0.5 g of sodium carbonate in 2 ml of water and 1.0 g of 4-amino-3-hydroxybutyric acid, the mixture was heated to 60° C. and made to undergo reaction while being agitated for 10 hours. Next, after the resulting gel was collected by filtration and washed by water and 0.01N aqueous hydrochloric-acid solution, the washed gel was again washed by a large amount of water and dried. The amount of the amino group determined by nonaqueous titration using perchloric acid was 0.25 mM per 1 g of the dry gel.

EXAMPLE 9

The same operation as in Example 8 was performed by using 1,4-butanediol diglycidylether and serine instead of epichlorohydrine and 4-amino-3-hydrobutyric acid respectively. The thus produced dry gel contained 0.3 mM of the amino group per 1 g.

EXAMPLE 10

The same operation as in Example 9 was performed by using 4-amino-3-hydroxybutyric acid instead of serine. The thus produced dry gel contained 0.15 mM of the amino group per 1 g.

EXAMPLE 11

The same operation as in Example 8 was performed by using ethyleneglycol diglycidylether and glucosaminic acid instead of epichlorohydrin and 4-amino-5-hydrobutyric acid respectively. The thus produced dry gel contained 0.08 mM of the amino group per 1 g.

EXAMPLE 12

The same operation as in Example 6 was performed on the gel produced in Example 10, thereby producing a dry adsorbent gel carrying 9.6 mg of concanavalin A per 1 g.

EXAMPLE 13

Concanavalin A was bound to the gel produced in Example 12 and the carriers produced in Examples 8 and 9 by the same operation as in Example 12, thereby producing gels. Then, each of these gels was packed in a column (made of a stainless steel, 4.6$\phi \times$75 mm) and the amounts of $\gamma$-globulin adsorbed by these gels were compared by using a high performance liquid chromatogram. As the result, the results shown in Table 1 were obtained.

TABLE 1

| Concanavalin-A-carrying gel | Concanavalin A (mg) | Eluent A (retention time, minutes) | Eluent B (retention time, minutes) |
|---|---|---|---|
| 1. Gel produced from the carrier produced in Example 8 | 12.8 | 1.2 | 1.2 |
| 2. Gel produced from the carrier produced in Example 9 | 6.5 | 1.2 | 1.2 |
| 3. Gel produced in Example 12 | 9.6 | 1.3 | 1.2 |
| Reference gel (1) | 10.3 | not eluted | 1.2 |
| Reference gel (2) | 6.9 | not | 1.3 |

TABLE 1-continued

| Concanavalin-A-carrying gel | Concanavalin A (mg) | Eluent A (retention time, minutes) | Eluent B (retention time, minutes) eluted |
|---|---|---|---|

Reference gel (1): Prepared by using 4-aminobutyric acid instead of 4-amino-3-hydroxybutyric acid used in Example 8.
Reference gel (2): Prepared by using 4-aminobutyric acid instead of 4-amino-3-hydroxybutyric acid used in Example 10.
Eluent (A): a 0.02 M Tris-hydrochloric acid buffer solution (pH 7.4) containing 1.5 M ammonium sulfate
Eluent (B): 0.02 M Tris-hydrochloric acid buffer solution (pH 7.4) containing 1.3 M ammonium sulfate
Detector: Ultraviolet Spectrophotometer, 280 nm
Flow rate: 1.0 ml/min.

EXAMPLE 14

After 1.0 g of the gel produced by introducing epoxy groups in Example 3 (epoxy group: 0.3 mM per 1 g of the dry gel) was added to 2 ml of an aqueous solution containing 0.1 mM calcium chloride, 0.1 mM manganese chloride, 0.05M sodium hydrogencarbonate and 0.05M sodium carbonate, 20 mg of concanavalin A and 25 mg of α-methyl-D-mannopyranoside were added and the mixture was agitated at room temperature for eight hours. Then, the agitated mixture was left at 4° C. overnight and the resulting gel was collected by filtration prior to being washed by 1M aqueous sodium-chloride solution and water. Next, after 2 ml of 1M aqueous ethanolamine solution was added and the mixture was agitated at room temperature for one hour, the gel was again collected by filtration and washed by water. It was determined from the amount of concanavalin A which had been recovered without undergoing any reaction that 1.5 mg of concanavalin A was carried by each 1 g of the thus produced adsorbent gel.

EXAMPLE 15

After 1.0 g of the gel produced by introducing epoxy groups in Example 14 was added to 20 ml of an aqueous acetic-acid solution (the ratio of water to acetic acid, 1:9) which contained 1.0 g of sodium periodate, the mixture was agitated at room temperature for two hours. The resulting gel was then collected by filtration and washed by water. Then, the washed gel was added to 3 ml of an aqueous solution containing 1 mM calcium chloride, 1 mM manganese chloride, 0.03M acetic acid and 0.06M sodium acetate. Next, after 20 mg of concanavalin A and 25 mg of α-methyl-D-mannopyranoside were added and the mixture was agitated at room temperature for eight hours, the resulting gel was collected by filtration and washed by 1M aqueous sodium-chloride solution and water. Next, the washed gel was added to 2 ml of a 1M Tris-hydrochloric acid buffer solution (pH 8.0) containing 20 mg of sodium cyanoboron hydride and then the mixture was agitated at room temperature for one hour. After that, the gel was again collected by filtration and washed by water. It was determined that 10.3 mg of concanavalin A was carried by each 1 g of the dry gel.

EXAMPLE 16

The epoxy groups of an epoxy-groups-containing copolymer gel produced from glycidyl methacrylate and ethyleneglycol dimethacrylate were made to undergo ring-opening reaction by water. Next, after epoxy groups were introduced into the reaction product by using ethyleneglycol diglycidylether, carboxyl groups were introduced into the reaction product by using 4-aminobutyric acid. The resulting gel was then subjected to the same operation as in Example 6, thereby producing a dry adsorbent gel carrying 25 mg of concanavalin A per 1 g.

EXAMPLE 17

After 0.8 g of the gel having been activated by N-hydroxysuccinic imide in Example 16 was added to 4.7 ml of a solution of 0.05M potassium phosphate and 0.15M sodium chloride which contained 5 mg of lectin derived from Abrus precatorius, 40 mg of 0.1M aqueous sodium-hydrogen-carbonate was added. Next, the mixture was subjected to the same operation as in Example 3, thereby producing a dry adsorbent gel which carried 2 mg of lectin derived from Abrus precatorius per 1 g.

EXAMPLE 18

The adsorbent produced in Example 15 was packed in a stainless steel column with a diameter of 4.7 mm and a length of 75 mm. Then, by referring to *Journal of Chromatography* Vol. 244 p. 52 (1982), a mixture of p-nitrophenol-α-D-glucoside (Compound 1), p-nitrophenol-β-glucoside (Compound 2) and p-nitrophenol-α-D-mannoside (Compound 3) was subjected to separation by using a high performance liquid chromatogram. As the result, good results were obtained as shown in Table 2.

TABLE 2

| Compound | Retention time (minutes) |
|---|---|
| Compound 2 | 2.6 |
| Compound 1 | 3.6 |
| Compound 3 | 6.8 |

Egg albumin was well adsorbed by the adsorbent when a 0.02M Tris-hydrochloric acid buffer solution (pH 7.4) containing 0.5M sodium chloride was used as the eluent and then was immediately eluted when 0.01M of α-methylmannoside was added.

EXAMPLE 19

The adsorbent produced in Example 17 was packed in a stainless steel column with a diameter of 7.5 mm and a length of 50 mm. Then, a mixture consisting of Compound (2) and Compound (3) used in Example 1 as well as p-nitrophenyl-α-galactoside (Compound 4) and p-nitrophenyl-β-galactoside (Compound 5) was subjected to separation. As the result, good results were obtained as shown in Table 3.

TABLE 3

| Compound | Retention Time (minutes) | |
|---|---|---|
| | Eluent (A) | Eluent (B) |
| Compound 2 | 3.1 | 3.1 |
| Compound 5 | 4.0 | 3.1 |
| Compound 4 | 4.0 | 3.1 |
| Compound 3 | 3.9 | 3.9 |

(Annotations)
Eluent (A): A 0.01 M Tris-hydrochloric acid buffer solution containing 0.05 M sodium chloride (pH 7.5)
Eluent (B): Prepared by adding 0.03 M lactose to the eluent (A).
Flow rate: 1.0 ml/minute Transferrin (human) and thyroglobulin (bovine) were well adsorbed by the adsorbent when the eluent (A) was used and then was immediately eluted when the eluent (B) was used instead of the eluent (A). Egg albumin and serum albumin (bovine) were not adsorbed.

EXAMPLE 20

The epoxy groups of the copolymer produced from glycidyl methacrylate and ethyleneglycol dimethacrylate were made to undergo ring-opening reaction by using water and then glycidyl groups were introduced into the reaction product. Next, the modified reaction product was made to react with ammonia to produce a gel (amino group: 0.16 mM per 1 g of the dry gel). After that, the thus produced gel was subjected to the same operation as in Example 5, thereby producing a dry adsorbent gel. It was determined by sulfur analysis that about 8 mg of heparin was carried by each 1 g of this dry gel.

EXAMPLE 21

After 1.0 g of the gel produced in Example 3 was sufficiently washed by absolute dioxane and the washed gel was added to 4 ml of absolute dioxane, 80 mg of N-hydroxysuccinic imide and 144 mg of dicyclohexyl carbodiimide were added and the mixture was agitated at room temperature for two hours. The resulting gel was then collected by filtration and quickly washed by 20 ml of absolute dioxane, 6 ml of methanol and 3 ml of cool water. Next, the washed gel was added to 2 ml of a 0.1M aqueous sodium-hydrogencarbonate solution which contained 100 mg of heparin sodium and then the mixture was agitated at room temperature for two hours. Following that, the mixture was left at 4° C. overnight and the resulting gel was collected by filtration and then washed by 1M aqueous sodium-chloride solution and water. Next, after the washed gel was added to 2 ml of 1M Tris-hydrochloric acid buffer solution (pH 8.0) and the mixture was agitated at room temperature for one hour, the gel was again collected by filtration and washed by water. It was determined that about 25 mg of heparin was carried by each 1 g of the thus produced dry gel.

EXAMPLE 22

The adsorbent produced in Example 20 was packed in a stainless steel column with a diameter of 4.6 mm and a length of 75 mm. Then, adsorption of thrombin by this adsorbent was examined by using a high performance chromatogram. Thrombin was well adsorbed by the adsorbent when a 0.01M Tris-hydrochloric acid buffer solution (pH 7.5) containing 0.15M sodium chloride was used as the eluent. The adsorbed thrombin was immediately eluted when the above buffer solution was replaced by a 0.01M Tris-hydrochloric acid buffer solution (pH 7.5) containing 1.25M sodium chloride.

EXAMPLE 23

After 1.0 g of the gel produced by introducing epoxy groups in Example 14 was added to a solution prepared by dissolving 20 mg of protein A in 2 ml of an aqueous solution of 0.05M sodium hydrogencarbonate and 0.05M sodium carbonate, the mixture was agitated at room temperature for eight hours and left at 4° C. overnight. The resulting gel was then collected by filtration and washed by 1M aqueous sodium-chloride solution and water. Next, after 2 ml of 1M aqueous ethanolamine solution was added to the washed gel and the mixture was agitated at room temperature for one hour, the gel was again collected by filtration and washed by water. It was determined from the amount of protein A which had been recovered without undergoing any reaction that 2.2 mg of protein A was carried by each 1 g of the dry gel.

EXAMPLE 24

After 1.0 g of the gel produced in Example 14 by introducing epoxy groups was added to 20 ml of an aqueous acetic-acid solution (consisting of water and acetic acid in a ratio of 1 to 9) containing 1.0 g of sodium periodate, the mixture was agitated at room temperature for two hours. Next, after the resulting gel was collected by filtration and washed by water, the washed gel was added to 3 ml of an aqueous solution containing 0.03M acetic acid and 0.06M sodium acetate. Then, 20 mg of protein A was added and the resulting mixture was agitated at room temperature for eight hours. Next, after the resulting gel was collected by filtration and washed by a 1M aqueous sodium-chloride solution and water, the washed gel was added to 2 ml of a 1M Tris-hydrochloric acid buffer solution (pH 8.0) containing 20 mg of sodium cyanoboron hydride and the mixture was agitated at room temperature for one hour. After that, the gel was again collected by filtration and washed by water. It was determined that 10.3 mg of protein A was carried by each 1 g of the thus produced dry adsorbent gel.

EXAMPLE 25

After 1.0 g of the gel produced in Example 16 by introducing carboxy groups was sufficiently washed by absolute dioxane and added to 4.0 ml of absolute dioxane, 80 mg of N-hydroxysuccinic imide and 144 mg of dicyclohexylcarbodiimide were added and the mixture was agitated at room temperature for two hours. The resulting gel was then collected by filtration and quickly washed by 20 ml of absolute dioxane, 6 ml of methanol and 3 ml of cool water in that order. Next, after the washed gel was added to 2 ml of an aqueous solution of 0.01M sodium hydrogen-carbonate which contained 20 mg of protein A, the mixture was agitated at room temperature for two hours and left at 4° C. overnight. The resulting gel was then collected by filtration and washed by a 1M aqueous sodium-chloride solution and water and the washed gel was added to 2 ml of 1M Tris-hydrochloric acid buffer solution (pH 8.0). Next, after the mixture was agitated at room temperature for one hour, the thus treated gel was again collected by filtration and washed by water. It was determined that 12.5 mg of protein A was carried by each 1 g of the thus produced dry adsorbent gel.

EXAMPLE 26

The adsorbent produced in Example 24 was packed in a stainless steel column with a diameter of 4.6 mm and a length of 75 mm. Then human IgG was subjected to the analysis by using an apparatus for a high performance liquid chromatography equipped with thus prepared column. As a result, the chromatograms as shown in FIG. 1 was obtained. Conditions for Analysis: Eluent ①; Buffer Solution of 0.1M Sodium Phosphate (pH 4.5), Eluent ②; Buffer Solution of 0.1M Sodium Phosphate (pH 3.0), Flow rate; 1.0 ml/min., Detector: Ultraviolet Spectrophotometer, 280 nm.

The chromatograms show the fact that human IgG cannot be adsorbed or, even when the fraction thereof is adsorbed, is easily eluted under the condition of pH 3 [FIG. 1(A)], and the fact that it is partly adsorbed and is partly out of adsorption [FIG. 1(B)].

EXAMPLE 27

Figure 2:
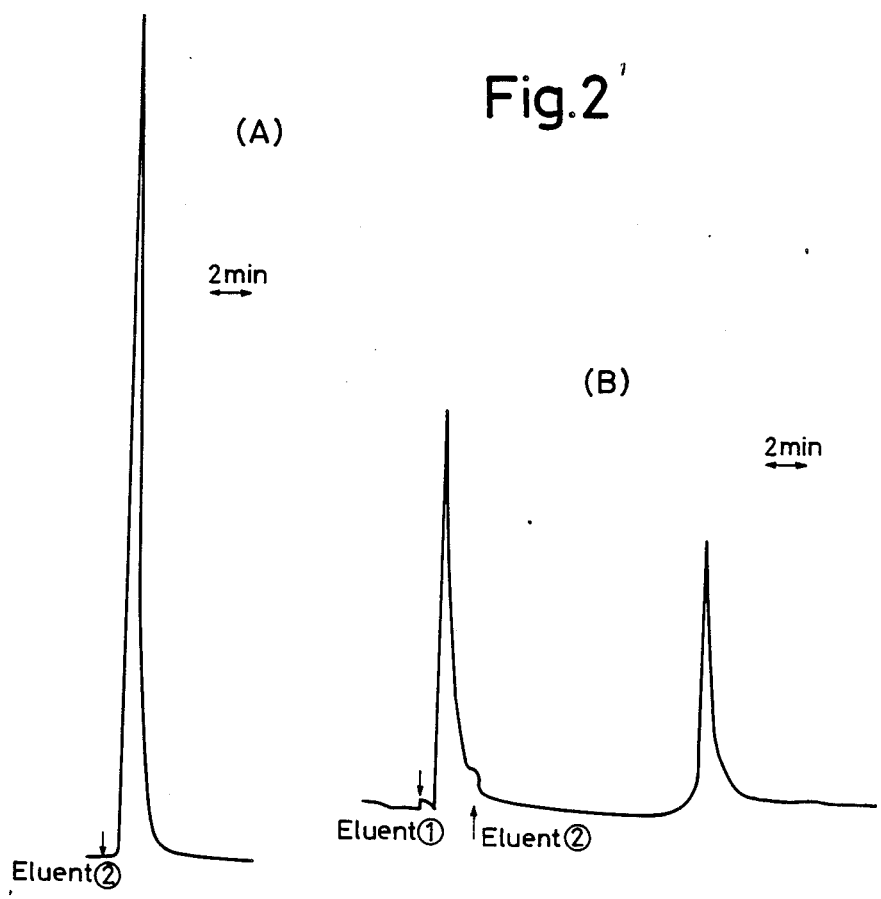

A preparation of an adsorbent and an analysis were taken place in the same manner as in Example 26, with the exception that the adsorbent produced in Example 25 was used instead of the adsorbent produced in Example 24 and that bovine γ-globulin was tested instead of human IgG. As a result, the chromatograms as shown in FIG. 2 was obtained.

The chromatograms show the fact that bovine γ-globulin cannot be adsorbed or, even when the fraction thereof is adsorbed, is easily eluted under the condition of pH 3 [FIG. 2(A)], and the fact that it is partly adsorbed and is partly out of adsorption [FIG. 2(B)].

EXAMPLE 28

An adsorbent was prepared in the same manner as in Example 23, with the exception that bovine serum albumin was used instead of protein A.

It was determined from the amount of bovine serum albumin which had been recovered without undergoing any reaction that 5.5 mg of bovine serum albumin was carried by each 1 g of the thus produced dry adsorbent gel.

EXAMPLE 29

An adsorbent was prepared in the same manner as in Example 24, with the exception that bovine serum albumin was used instead of protein A.

It was determined from the amount of bovine serum albumin which had been recovered without undergoing any reaction that 7.3 mg of bovine serum albumin was carried by each 1 g of the thus produced dry adsorbent gel.

EXAMPLE 30

An adsorbent was prepared in the same manner as in Example 25, with the exception that bovine serum albumin was used instead of protein A.

It was determined from the amount of bovine serum albumin which had been recovered without undergoing any reaction that 11.4 mg of bovine serum albumin was carried by each 1 g of the thus produced dry adsorbent gel.

EXAMPLE 31

Analyses of DL-tryptophan (FIGS. 3 through 5), N-(3,5-Dinitrobenzoyl)-DL-leucine (FIG. 6) and N-(3,5-dinitrobenzoyl)-DL-phenylglycine (FIG. 7) were taken place in the same manner as in Example 26 using the adsorbent produced in Example 30. As a result, the chromatograms as shown in FIGS. 3 through 7 were obtained. Conditions for Analyses: Buffer Solution of 0.02M tris hydrochloric acid, 0.10M sodium hydrochloride, Conditions for Elution: A; pH=8.0, B; pH=7.0, Flow rate; 0.5 ml/min., Detector; Ultraviolet Spectrophotometer, 254 nm.

Figure 3:
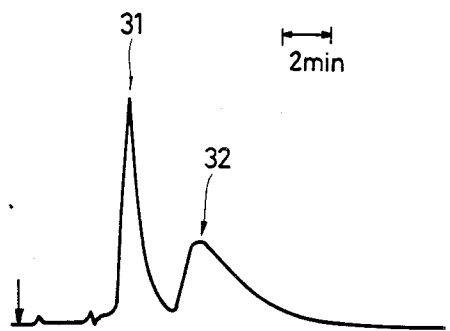
FIGS. 3, 4 and 5 show chromatograms of DL-tryptophan, D-tryptophan and L-tryptophan, respectively, which was subjected to adsorption and elution by the adsorbents in accordance with the present invention.
Figure 4:
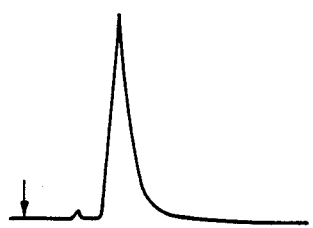
Figure 5:

FIG. 3
  DL-Tryptophane
  31: D Isomer
  32: L Isomer
  Condition for Elution: A
FIG. 4
  D-Tryptophane
  Condition for Elution: A
FIG. 5
  L-Tryptophane
  Condition for Elution: A
FIG. 6
  N-(3,5-Dinitrobenzoyl)-DL-leucine
  61: L Isomer
  62: D Isomer
  Condition for Elution: B
FIG. 7
  N-(3,5-Dinitrobenzoyl)-DL-phenylglycine
  71: S Isomer
  72: R Isomer
  Condition for Elution: A Concerning DL-tryptophane as shown in FIGS. 3 through 5, L-tryptophane was adsorbed more strongly and eluted later than D-tryptophane.

Figure 6:
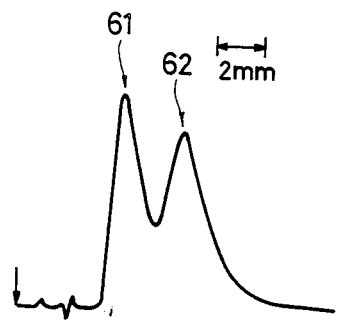
FIG. 6 shows a chromatogram of N-(3,5-dinitrobenzoyl)-DL-leucine subjected to adsorption and elution by the adsorbents in accordance with the present invention.
Figure 7:
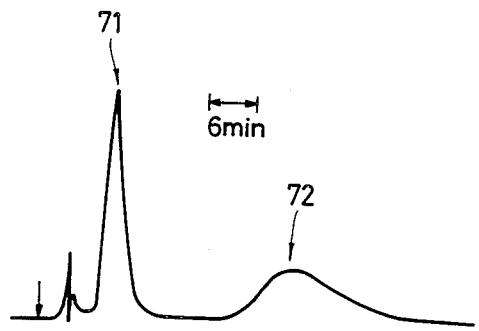
FIG. 7 shows a chromatogram of N-(3,5-dinitrobenzoyl)-DL-phenylglycine subjected to adsorption and elution by the adsorbents in accordance with the present invention.

Concerning N-(3,5-dinitrobenzoyl)-DL-leucine as shown in FIG. 6, the D isomer was adsorbed more strongly and eluted later than the L isomer.

Concerning N-(3,5-dinitrobenzoyl)-DL-phenylglycine, the R isomer was adsorbed more strongly and eluted later than the S isomer.

EXAMPLE 32

To a solution of 1.286 g of Cibaclon Blue F3G-A in 20 ml of water was added a solution of 1.16 g of 1,6-diaminohexane in 10 ml of 0.5N hydrochloric acid (pH 10.0). After the mixture was reacted at 50° C. for 1 hour, it was gradually poured into 200 ml of 0.3N hydrochloric acid and stirred for 5 minutes. Then, the precipitated crystalline was filtered and washed subsequently with 0.3N hydrochloric acid, acetone and ether. The thus washed crystalline was dried to give 0.78 g of powder of aminohexyl Cibaclon Blue F3G-A. (Yield: 53%)

EXAMPLE 33

An adsorbent was prepared in the same manner as in Example 23, with the exception that the aminohexyl Cibaclon Blue F3G-A produced in Example 32 was used instead of protein A and that the reaction was taken place at 50° C.

It was determined from the measurements of absorbances of the filtrate and washing used that 0.047 mM of Cibaclon Blue F3G-A was carried by each 0.6 g of the thus produced dry adsorbent gel.

EXAMPLE 34

An adsorbent was prepared in the same manner as in Example 24, with the exception that the aminohexyl Cibaclon Blue F3G-A produced in Example 32 was used instead of protein A.

It was determined that 0.094 mM of Cibaclon Blue F3G-A was carried by each 1 g of the thus produced dry adsorbent gel.

EXAMPLE 35

An adsorbent was prepared in the same manner as in Example 25, with the exception that the aminohexyl Cibaclon Blue F3G-A produced in Example 32 was used instead of protein A.

It was determined that 0.063 mM of Cibaclon Blue F3G-A was carried by each 1 g of the thus produced dry adsorbent gel.

EXAMPLE 36

Cytochrome C was analyzed in the same manner as in Example 26, with the exception that the adsorbent produced in Example 33 was used. As a result, the chromatograms as shown in FIG. 8 was obtained. Conditions for Analysis: Eluent ①; Buffer Solution of 0.1M Potassium Phosphate (pH 5.0), Eluent ②; Buffer Solution of 0.1M Potassium Phosphate (pH 5.0) +1.5M Potassium Chloride, Flow rate; 1.0 ml/min., Detector: Ultraviolet Spectrophotometer, 280 nm.

EXAMPLE 37

The analysis was taken place in the same manner as in Example 36, with the exception that lactic dehydrogenase was analyzed instead of cytochrome C and that the following eluent ③ and ④ were used instead of the eluent ① and ②, respectively.

Eluent ③; Buffer Solution of 0.1M Potassium Phosphate (pH 7.5) Eluent ④; Buffer Solution of 0.1M Potassium Phosphate (pH 7.5) +1.5M potassium chloride.

As a result, the chromatogram as shown in FIG. 9 was obtained.

EXAMPLE 38

The analysis was taken place in the same manner as in Example 36, with the exception that bovine serum albumine was analyzed instead of cytochrome C and that the following above eluent ④ was used instead of the eluent ②.

As a result, the chromatogram as shown in FIG. 10 was obtained.

EXAMPLE 39

The analysis was taken place in the same manner as in Example 36, with the exception that egg white albumine was analyzed instead of cytochrome C.

As a result, the chromatogram as shown in FIG. 11 was obtained.

As seen from FIGS. 8 through 10, the testing samples were adsorbed by using the eluent ① or ③ and then eluted by using the eluent ② or ④ at the point indicated by the arrow. In addition, the testing sample of Example 39 was not adsorbed by the eluent ①.

EXAMPLE 40

An adsorbent was prepared in the same manner as in Example 33, with the exception that acryflavin was used instead of the aminohexyl Cibaclon Blue F3G-A.

It was determined from the titration using 0.01N hydrochloric acid that 0.020 mM of acryflavin was carried by each 1 g of the thus produced dry adsorbent gel.

EXAMPLE 41

An adsorbent was prepared in the same manner as in Example 24, with the exception that acryflavin was used instead of protein A.

It was determined that 0.041 mM of acryflavin was carried by each 1 g of the thus produced dry adsorbent gel.

EXAMPLE 42

An adsorbent was prepared in the same manner as in Example 25, with the exception that acryflavin was used instead of protein A.

It was determined that 0.038 mM of acryflavin was carried by each 1 g of the thus produced dry adsorbent gel.

EXAMPLE 43

Adenosine-5'-monophosphate (121), adenosine-5'-diphosphate (122) and adenosine-5'-triphosphate (123) as well as adenosine (131) and adenine (132) were analyzed in the same manner as in Example 26, with the exception that the adsorbent produced in Example 40 was used. As a result, the chromatograms as shown in FIGS. 12 and 13 were obtained.

Conditions for Analysis: Eluent; Buffer Solution of 0.1M ethylmorpholine-acetic acid (pH 7.0, hereinunder referred to as the eluent ①), Flow rate; 1.0 ml/min. Detector; Ultraviolet Spectrophotometer, 260 nm.

Figure 12:
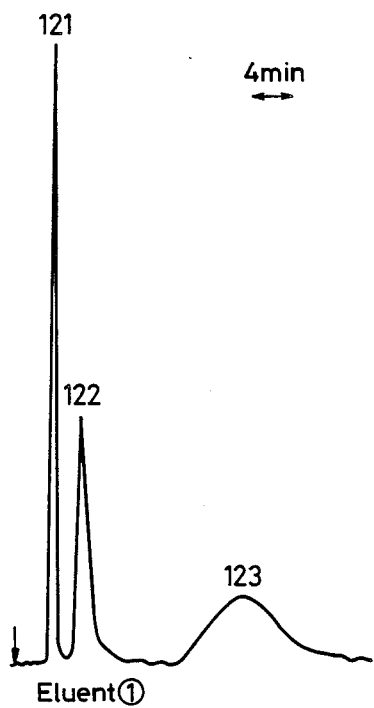
FIGS. 12, 13, 14, 15, 16, 17, 18, 19, 20a, 20B, 21A, 21B, 22, 23, 24, and 25 show chromatograms in the adsorption and elution by the adsorbents in accordance with the present invention in a high performance liquid chromatography.
Figure 13:
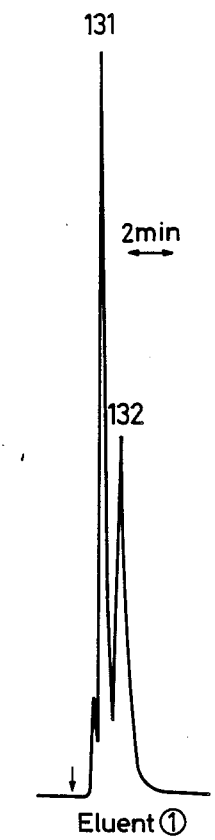

As seen from FIGS. 12 and 13, the testing samples were isolated and eluted by using the eluent ①.

EXAMPLE 44

Adenosine-5'-monophosphate was analyzed in the same manner as in Example 43, with the exception that a buffer solution of 0.01M ethylmorpholine-acetic acid (pH 7.0, hereinunder referred to as the eluent ② was used in addition to the eluent ①. As a result, the chromatogram as shown in FIG. 14 was obtained.

Figure 14:
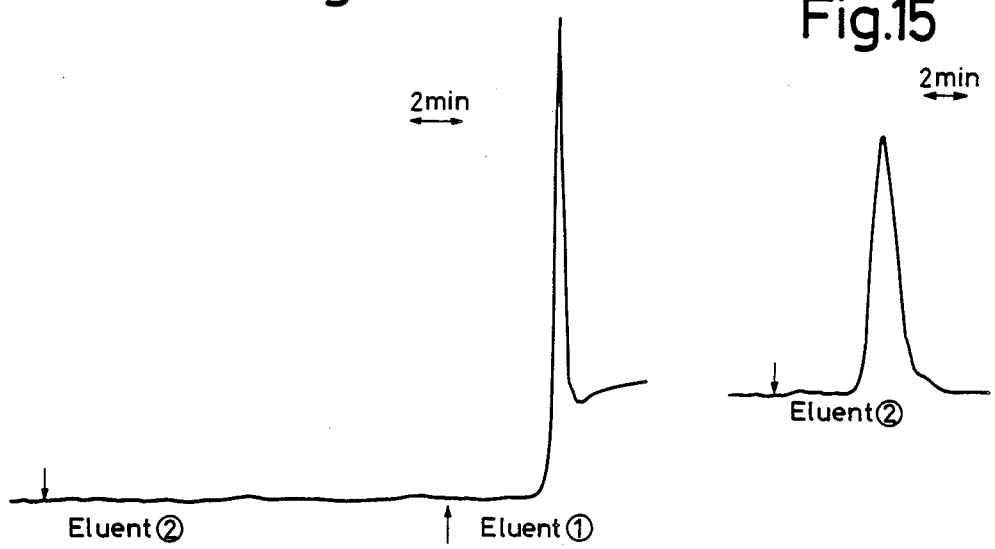

As seen from FIG. 14, adenosine-5'-monophosphate can not be adsorbed by using the eluent ①, however, it may be adsorbed by using the eluent ② (the start of addition was indicated by the arrow) in FIG. 14.

EXAMPLE 45

Riboflavin was analyzed in the same manner as in Example 43, with the exception that the eluent ② was used instead of the eluent ①. As a result, the chromatogram as shown in FIG. 15 was obtained.

Figure 15:
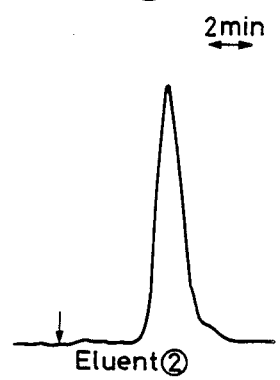

As seen from FIG. 15, the testing sample was not adsorbed but eluted by using the eluent ②.

EXAMPLE 46

After 1.0 g of the gel in Example 14 was added to 3 ml of a solution of 0.53 g of sodium iminodiacetate by an aqueous solution of 2M sodium carbonate and the mixture was agitated at 65° C. for 24 hours. Then, the agitated mixture was left at 4° C. overnight and the resulting gel was collected by filtration prior to being washed by 10% acetic acid and water.

It was determined from the titration by 0.1N aqueous solution of sodium hydroxide that 0.090 mM of iminodiacetic acid was carried by each 1 g of the thus produced dry adsorbent gel.

EXAMPLE 47

An adsorbent was prepared in the same manner as in Example 25, with the exception that iminodiacetate was used instead of protein A.

It was determined that 0.055 mM of iminodiacetic acid was carried by each 1 g of the thus produced dry adsorbent gel.

EXAMPLE 48

Figure 16:
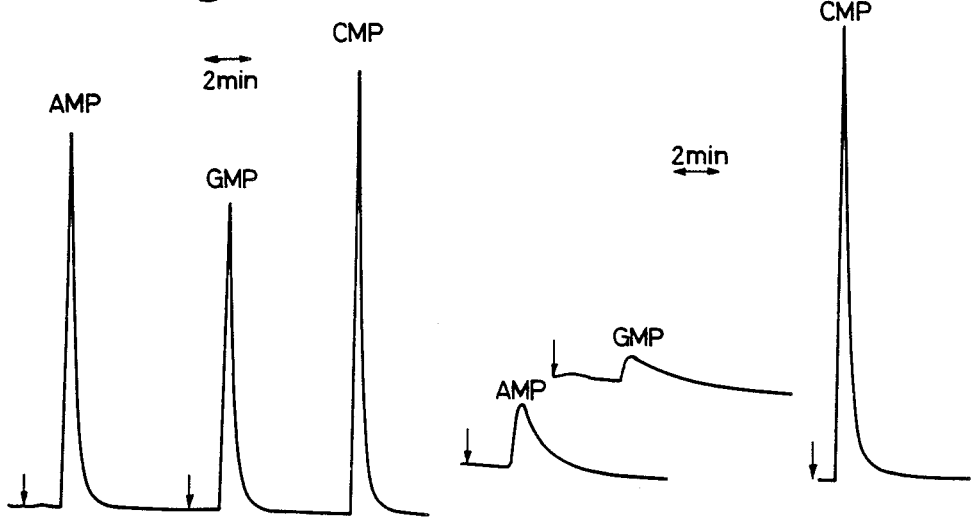

Adenosine-5'-monophosphate (AMP), guanosine-5'-monophosphate (GMP) and cytidine-5'-monophosphate (CMP) were analyzed in the same manner as in Example 26, with the exception that the adsorbent produced in Example 46 was used. As a result, the chromatograms as shown in FIG. 16 were obtained.

Conditions for Analysis: Eluent; Buffer Solution of 0.05M ethylmorpholine-acetic acid (pH 6.0), Flow rate; 1.0 ml/min. Detector; Ultraviolet Spectrophotometer, 280 nm.

EXAMPLE 49

The analyses were carried out in the same manner as in Example 48, with the exception that the adsorbent was treated by flowing 50 mM aqueous solution of copper sulfate therethrough to coordinate copper and sufficiently washing by the eluent to be used. As a result, the chromatogram as shown in FIG. 17 was obtained.

Figure 17:
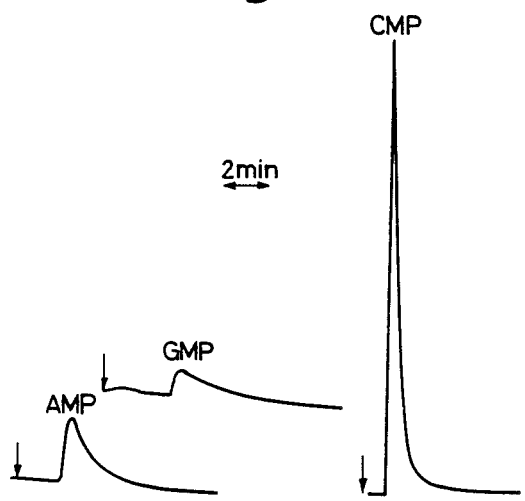

As seen from FIGS. 16 and 17, the coordination of copper caused the delay of elution.

EXAMPLE 50

Figure 18:
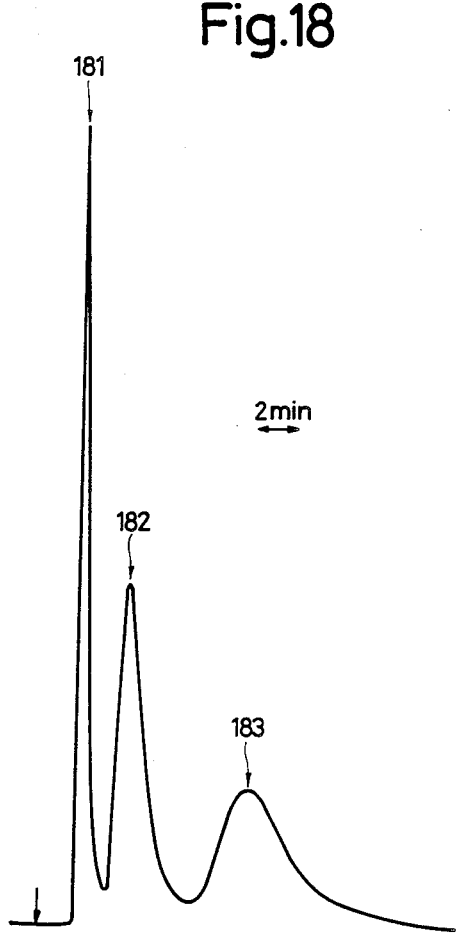

The analyses were carried out in the same manner as in Example 49, with the exception that uridine, guanosine and adenosine were analyzed instead of AMP, GMP and CMP. As a result, the chromatogram as shown in FIG. 18 was obtained. In FIG. 18, 181 is uridine and cytidine, 182 is guanosine and 183 is adenosine.

As seen from FIG. 18, the coordination of copper caused the delay of elution.

EXAMPLE 51

Bovine serum albumine (BSA) and transferrin were analyzed in the same manner as in Example 48, with the exception that a buffer solution of 0.1M sodium acetate (pH 7.7) and 0.5 mole of sodium chloride (hereinunder referred to as the eluent ①) was used instead of a buffer solution of 0.05M ethylmorpholine-acetic acid. As a result, the chromatogram as shown in FIG. 19 was obtained.

EXAMPLE 52

BSA was analyzed in the same manner as in Example 49, with the exception that the eluent ① in Example 51 added with a buffer solution of 0.05M of tris hydrochloric acid (pH 8.0) and 0.15 mole of ammonium chloride (hereinunder referred to as the eluent ②) was used instead of the buffer solution of 0.05M ethylmorpholine-acetic acid. As a result, the chromatogram as shown in FIG. 20 was obtained.

Figure 19:
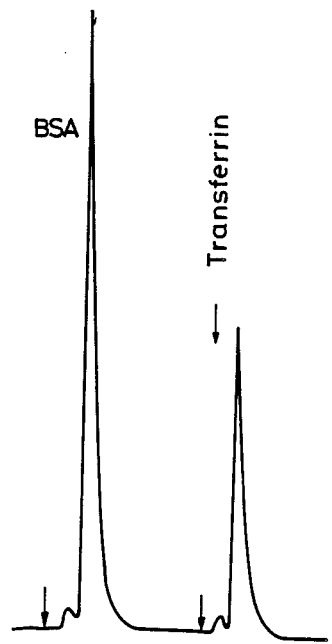
Figure 20:
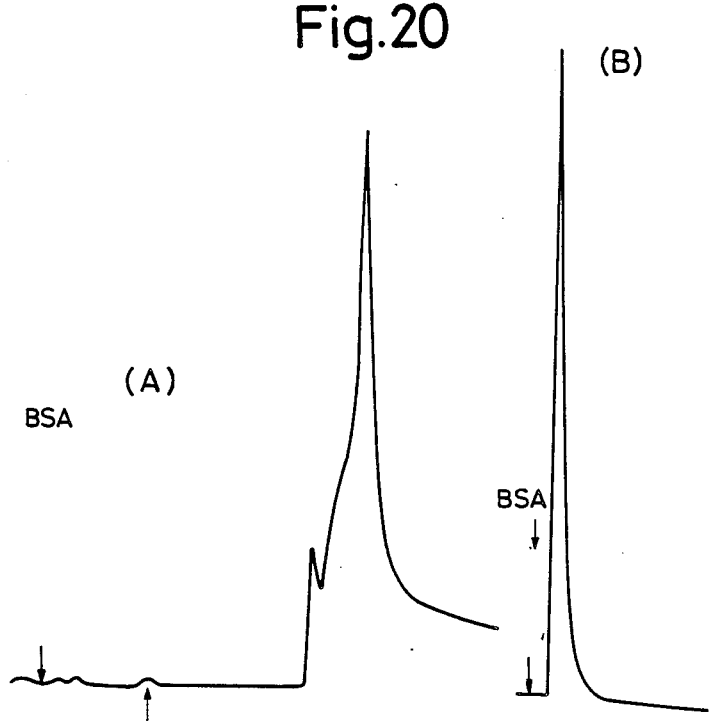

As seen from FIGS. 19 and 20, BSA and transferrin were not adsorbed without the coordination of copper. BSA may be eluted by adsorbing using the eluent ① under the existence of copper and then eluting by the eluent ② (the start of elution was indicated by the arrow).

EXAMPLE 53

BSA and transferrin were analyzed in the same manner as in Example 49, with the exception that an aqueous solution of zinc sulfact was used instead of an aqueous solution of copper sulfate, and that the eluent ① in Example 51 and the eluent ② in Example 52 were used instead of the buffer solution of 0.05M ethylmorpholine-acetic acid. As a result, the chromatogram as shown in FIG. 21 was obtained.

Figure 21:
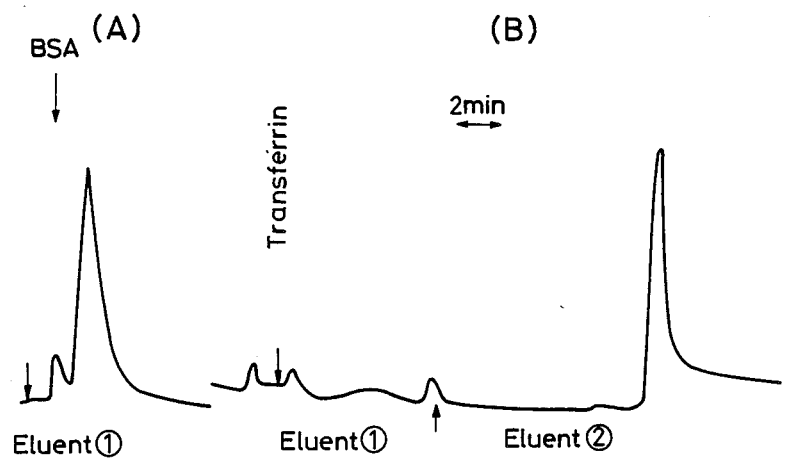

As seen from FIG. 21, the use of zinc as a coordinating metal results in the non-adsorption of BSA and adsorption of transferrin by the eluent ① and elution of thus adsorbed transferrin by the eluent ② (the start of elution was indicated by the arrow).

EXAMPLE 54

After 140 mg of semi sulfuric acid salt of 3-aminophenylboric acid to an aqueous suspension of 600 mg of the gel produced by introducing epoxy groups in Example 14, the mixture was adjusted its pH to 8.5 with 4M aqueous solution of sodium hydroxide and agitated at room temperature overnight. Then, the resulting gel was collected by filtration and washed with 1M aqueous solution of sodium chloride and water.

It was determined from the titration by 0.1N aqueous solution of sodium hydroxide that 0.06 mM of phenylboric acid was carried by each 1 g of the thus produced adsorbent gel.

EXAMPLE 55

An adsorbent was produced in the same manner as in Example 54, with the exception that epichlorohydrin was used instead of 1,4-butanediol diglycidyl ether. It was determined that 0.12 mM of phenylboric acid was carried by each 1 g of the thus produced adsorbent gel.

EXAMPLE 56

An adsorbent was prepared in the same manner as in Example 25, with the exception that semi sulfuric acid salt of 3-aminophenylboric acid was used instead of protein A.

It was determined that 0.03 mM of phenylboric acid was carried by each 1 g of the thus produced dry adsorbent gel.

EXAMPLE 57

After 600 mg of the gel produced in Example 4 was added to 10 ml of 0.1M aqueous solution of sodium chloride, the mixture was added with 164 mg of semi sulfuric acid salt of 3-aminophenylboric acid during the mixture was kept at 0° C. Then, the mixture was adjusted its pH to 8.5 and added with 165 mg of hydrochloric acid salt of 1-ethyl-3-(3-dimethylaminopropyl) carbodiimide. The thus obtained mixture was then agitated for 3 hours and stood at 4° C. overnight. The resulting gel was collected by filtration and washed with 0.1N aqueous solution of sodium chloride.

It was determined from the measurement its ultraviolet absorbance that 0.47 mM of 3-aminophenylboric acid was carried by each 1 g of the thus obtained dry adsorbent gel.

EXAMPLE 58

An adsorbent was produced in the same manner as in Example 57, with the exception that 1,3-diaminopropane was used instead of 25% aqueous ammonia.

It was determined that 0.32 mM of phenylboric acid was carried by each 1 g of the thus obtained dry adsorbent gel.

EXAMPLE 59

The analyses were carried out in the same manner as in Example 26, with the exception that the adsorbents produced in Examples 54 through 58 were used. The results were shown in Table 1.

Conditions for Analyses: Eluent; Buffer Solution of 0.1M potassium phosphate (pH 7.5), Flow rate; 1.0 ml/min., Detector; Ultraviolet Spectrophotometer, 260 nm, or Differential Refractometer.

TABLE 1

| | Period in which Samples were kept adsorbed (minutes) | | | | |
|---|---|---|---|---|---|
| | Adsorbent | | | | |
| Testing Sample | Compound of Example 54 | Compound of Example 55 | Compound of Example 56 | Compound of Example 57 | Compound of Example 58 |
| Adenosine-5'-triphosphate | 1.2 | 1.4 | 1.0 | 2.6 | 1.6 |
| Adenosine-5'-diphosphate | 1.4 | 1.6 | 1.0 | 2.8 | 1.8 |
| Adenosine-5'- | 1.6 | 1.8 | 1.1 | 2.9 | 2.2 |

TABLE 1-continued

| | Period in which Samples were kept adsorbed (minutes) | | | | |
|---|---|---|---|---|---|
| | Adsorbent | | | | |
| Testing Sample | Compound of Example 54 | Compound of Example 55 | Compound of Example 56 | Compound of Example 57 | Compound of Example 58 |
| monophosphate | | | | | |
| Thymidine | 1.2 | 1.2 | 1.0 | 1.3 | 1.1 |
| 2'-Deoxyguanosine | 1.2 | 1.2 | 1.0 | 1.3 | 1.4 |
| 2'-Deoxyadenosine | 1.2 | 1.2 | 1.0 | 1.3 | 1.4 |
| Cytidine | 1.8 | 2.3 | 1.5 | 2.6 | 2.8 |
| Uridine | 1.8 | 2.3 | 1.5 | 3.2 | 3.4 |
| Adenosine | 2.2 | 3.9 | 2.6 | 6.7 | 7.6 |
| Guanosine | 2.2 | 3.9 | 2.6 | 6.7 | 7.6 |
| Glucose | 1.4 | 1.6 | 1.3 | 1.8 | 1.6 |
| Mannose | 1.3 | 1.5 | 1.3 | 1.8 | 1.6 |
| Mannitol | 1.7 | 2.1 | 1.5 | 3.3 | 3.0 |
| Fructose | 1.8 | 2.4 | 1.6 | 3.5 | 3.2 |
| Sorbitol | 2.5 | 3.6 | 1.9 | 5.3 | 4.8 |

EXAMPLE 60

An adsorbent was produced in the same manner as in Example 46, with the exception that 0.35 g of ethylenediaminediacetic acid was used instead of sodium iminodiacetate. It was determined that 0.07 mM of ethylenediaminediacetic acid was carried by each 1 g of the thus obtained dry adsorbent gel.

EXAMPLE 61

Figure 22:
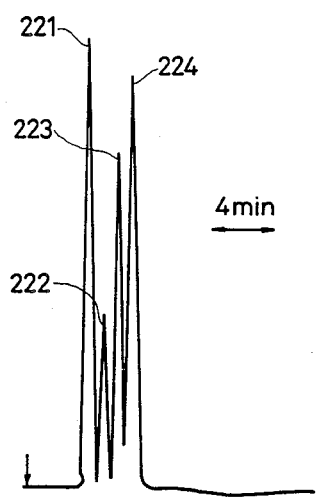

Cytidine (221), uridine (221), guanosine (222), adenosine (223) and deoxyadenosine (224) were analyzed in the same manner as in Example 26, with the exception that the adsorbent produced in Example 60 was used. As a result, the chromatograms as shown in FIG. 22 were obtained.

Conditions for Analyses: Eluent; 0.05M 4-ethylmorpholine-acetate (pH 5.65), Flow Rate; 0.5 ml/min., Temperature of Column; 25° C., Detector; Ultraviolet Spectrophotometer.

EXAMPLE 62

To 1.0 g of a gel (containing 0.2 mM of amino groups per 1 g of dry gel) produced by converting epoxy groups of the gel produced by introducing epoxy groups in Example 3 into amino groups using water were added a solution of 243 mg of biotin by 3 ml of dimethylsuloxide and 206 mg of dicyclocarbodiimide. The mixture was reacted at room temperature for 2 hours and the resulting gel was collected by filtration and washed with methanol, and water.

It was determined from the content of sulfur as measured by an elementary analysis that 10 mg of biotin was carried by each 1 g of the thus produced dry adsorbent gel.

EXAMPLE 63

Figure 23:
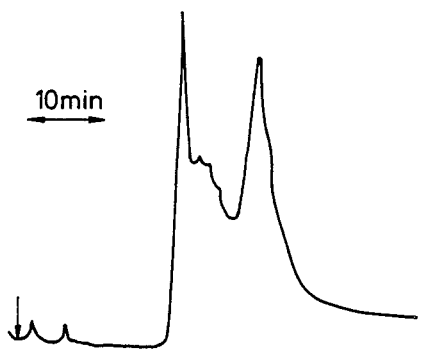

The analysis of avidin was carried out in the same manner as in Example 26, with the exception that the adsorbent produced in Example 62 was used. As a result, the chromatogram as shown in FIG. 23 was obtained.

Conditions for Analysis: Eluent; Buffer Solution of 0.01M sodium phosphate (pH 7.0, hereinunder referred to as the eluent ①), Buffer Solution of 0.01M sodium phosphate +0.1M NaCl (pH 7.0, hereinunder referred to as the eluent ②), Eluent ①→②, Lineargradient, Flow Rate; 0.5 ml/min., Temperature of Column; 28° C., Detector; Ultraviolet Spectrophotometer, 230 nm.

EXAMPLE 64

Figure 24:
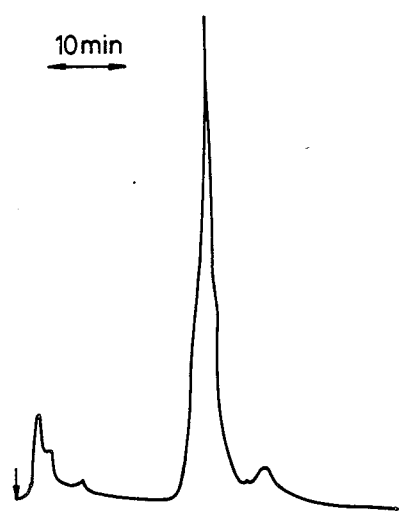

The analysis of an egg white was carried out in the same manner as in Example 63. As a result, the chromatogram as shown in FIG. 24 was obtained.

EXAMPLE 65

An adsorbent was produced in the same manner as in Example 20, with the exception that 30 mg of N-actylglucosamine was used instead of sodium salt of heparin. It was determined that nearly 8 mg of N-acetylglucosamine was carried by each 1 g of the thus obtained dry adsorbent gel.

EXAMPLE 66

An adsorbent was produced in the same manner as in Example 21, with the exception that 40 mg of N-acetylglucosamine was used instead of sodium salt of heparin. It was determined that nearly 15 mg of N-acetylglucosamine was carried by each 1 g of the thus obtained dry adsorbent gel.

EXAMPLE 67

Figure 25:
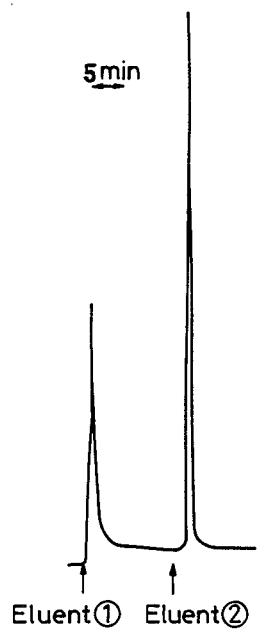

The analysis of lysozyme was carried out in the same manner as in Example 26, with the exception that the adsorbent produced in Example 65 was used. As a result, the chromatogram as shown in FIG. 25 was obtained.

Conditions for Analysis: Eluent; Buffer Solution of 0.01M tris hydrochloric acid +0.01M NaCl (pH 7.5, hereinunder referred to as the eluent ①), Buffer Solution of 0.01M tris hydrochloric acid (pH 7.5, hereinunder referred to as the eluent ②), Flow rate; 1 ml/min., Detector; Ultraviolet Spectrophotometer, 280 nm.

What is claimed is:

1. An adsorbent for chromatography which is a porous copolymer comprising a gel copolymer having particles sized and dimensioned to effect chromatographic separation which is principally composed of (A) a glycidyl monovinylester or glycidyl monovinylether and (B) alkyleneglycol divinylester, a combination group bound to the epoxy group of the (A) component and a ligand bound through a covalent bond to the combination group, the combination group being formed by binding an aminocarboxylic acid having a hydroxyl group to the epoxy group of said gel copolymer or the glycidyl group of a modified gel copolymer obtained by binding a glycidyl group-containing compound to the hydroxyl group formed by ring-opening with water of the epoxy group of said gel copolymer.

2. The adsorbent as claimed in claim 1, in which said ligand is lectin.

3. The adsorbent as claimed in claim 1, in which said ligand is heparin.

4. The adsorbent as claimed in claim 1, in which said ligand is protein A.

5. The adsorbent as claimed in claim 1, in which said ligand is serum albumin.

6. The adsorbent as claimed in claim 1, in which said ligand is triazine dyestuff.

7. The adsorbent as claimed in claim 1, in which said ligand is acriflavine.

8. The adsorbent as claimed in claim 1, in which said ligand is iminodiacetic acid.

9. The adsorbent as claimed in claim 1, in which said ligand is phenylboric acid.

10. The adsorbent as claimed in claim 1, in which said ligand is ethylenediamine diacetic acid.

11. The adsorbent as claimed in claim 1, in which said ligand is biotin.

12. The adsorbent as claimed in claim 1, in which said ligand is N-acetyl glucosamine.

* * * * *